United States Patent
Chu et al.

(10) Patent No.: US 10,849,080 B1
(45) Date of Patent: Nov. 24, 2020

(54) TRIGGER MPDU FOR CLIENT-SELECTABLE TRANSMIT POWER

(71) Applicant: Marvell International Ltd., Hamilton (BM)

(72) Inventors: Liwen Chu, San Ramon, CA (US); Hongyuan Zhang, Fremont, CA (US); Hui-Ling Lou, Sunnyvale, CA (US)

(73) Assignee: Marvell Asia Pte, Ltd., Singapore (SG)

( * ) Notice: Subject to any disclaimer, the term of this patent is extended or adjusted under 35 U.S.C. 154(b) by 23 days.

(21) Appl. No.: 16/176,104

(22) Filed: Oct. 31, 2018

Related U.S. Application Data (60) Provisional application No. 62/591,613, filed on Nov. 28, 2017.

(51) Int. Cl.
*H04W 52/54* (2009.01)
*H04W 84/12* (2009.01)

(52) U.S. Cl.
CPC ............ *H04W 52/54* (2013.01); *H04W 84/12* (2013.01)

(58) Field of Classification Search
CPC .................................................... H04W 52/54
See application file for complete search history.

(56) References Cited

U.S. PATENT DOCUMENTS

| 9,166,660 | B2 | 10/2015 | Chu et al. |
|---|---|---|---|
| 2013/0229996 | A1 | 9/2013 | Wang et al. |
| 2015/0131517 | A1 | 5/2015 | Chu et al. |
| 2016/0029373 | A1 | 1/2016 | Seok |
| 2016/0323879 | A1 | 11/2016 | Ghosh et al. |
| 2017/0188390 | A1 | 6/2017 | Adachi et al. |
| 2017/0202026 | A1 | 7/2017 | Ahn et al. |
| 2017/0279864 | A1 | 9/2017 | Chun et al. |
| 2018/0184385 | A1* | 6/2018 | Kraemer ............. H04W 52/365 |

OTHER PUBLICATIONS

IEEE P802.11ax™/D1.4, "Draft Standard for Information technology—Telecommunications and information exchange between systems Local and metropolitan area networks—Specific Requirements, Part 11: Wireless LAN Medium Access Control (MAC) and Physical Layer (PHY) Specifications, Amendment 6: Enhancements for High Efficiency WLAN," IEEE Computer Society, 453 pages (Aug. 2017).

IEEE P802.11ax™/D2.2, "Draft Standard for Information technology—Telecommunications and information exchange between systems Local and metropolitan area networks—Specific Requirements, Part 11: Wireless LAN Medium Access Control (MAC) and Physical Layer (PHY) Specifications, Amendment 6: Enhancements for High Efficiency WLAN," IEEE Computer Society, 620 pages (Feb. 2018).

(Continued)

*Primary Examiner* — John D Blanton (57) ABSTRACT

A method is described. A trigger medium access control protocol data unit (MPDU) is generated at a first communication device. The trigger MPDU is configured to solicit a second communication device to transmit a trigger-based data unit to the first communication device. A transmit power indication in the trigger MPDU is set to indicate that a transmit power level of the trigger-based data unit is to be selected by the second communication device. The trigger MPDU is transmitted from the first communication device to the second communication device.

22 Claims, 6 Drawing Sheets

(56) References Cited

OTHER PUBLICATIONS

IEEE Std 802.11—REVmc™/D8.0 (revision of IEEE Std. 802.11™—2012) "Draft Standard for Information technology—Telecommunications and information exchange between systems—Local and metropolitan area networks—Specific requirements" Part 11: Wireless LAN Medium Access Control (MAC) and Physical Layer (PHY) Specifications, *The Institute of Electrical and Electronics Engineers, Inc.*, 3774 pages (Aug. 2016).
Kwon et al., "SIG Structure for UL PPDU," IEEE Draft, doc. IEEE 802.11-15/0574r0, vol. 802.11ax, 18 pages (May 11, 2015).
Merlin et al., "Trigger Frame Format," IEEE Draft, doc. IEEE 802.11-15/0877r1, vol. 802.11ax, No. 1, 16 pages (Jul. 13, 2015).
Tandai et al., "An Efficient Uplink Multiuser MIMO Protocol in IEEE 802.11 WLANs," IEEE 20th International Symposium on Personal, Indoor and Mobile Radio Communications (PIMRC 2009), pp. 1153-1157 (Sep. 13, 2009).

\* cited by examiner

TRIGGER MPDU FOR CLIENT-SELECTABLE TRANSMIT POWER

CROSS REFERENCES TO RELATED APPLICATIONS

This application claims the benefit of U.S. Provisional Patent App. No. 62/591,613, entitled "Single User Transmission in HE TB PPDU," filed on Nov. 28, 2017, the disclosure of which is hereby expressly incorporated herein by reference in its entirety.

FIELD OF TECHNOLOGY

The present disclosure relates generally to wireless communication systems, and more particularly to multi-user transmissions.

BACKGROUND

Wireless local area networks (WLANs) have evolved rapidly over the past decade, and development of WLAN standards such as the Institute for Electrical and Electronics Engineers (IEEE) 802.11 Standard family has improved single-user peak data throughput. For example, the IEEE 802.11b Standard specifies a single-user peak throughput of 11 megabits per second (Mbps), the IEEE 802.11a and 802.11g Standards specify a single-user peak throughput of 54 Mbps, the IEEE 802.11n Standard specifies a single-user peak throughput of 600 Mbps, and the IEEE 802.11ac Standard specifies a single-user peak throughput in the gigabits per second (Gbps) range. Future standards promise to provide even greater throughput, such as throughputs in the tens of Gbps range.

SUMMARY

In an embodiment, a method includes generating, at a first communication device, a trigger medium access control protocol data unit (MPDU) configured to solicit a second communication device to transmit a trigger-based data unit to the first communication device, including setting a transmit power indication in the trigger MPDU that indicates that a transmit power level of the trigger-based data unit is to be selected by the second communication device. The method also includes transmitting, from the first communication device, the trigger MPDU to the second communication device.

In another embodiment, an apparatus includes a network interface device. The network interface device is associated with a first communication device and the network interface device includes one or more integrated circuits (ICs) configured to generate a trigger medium access control protocol data unit (MPDU) configured to solicit a second communication device to transmit a trigger-based data unit to the first communication device, including setting a transmit power indication in the trigger MPDU that indicates that a transmit power level of the trigger-based data unit is to be selected by the second communication device. The one or more ICs are further configured to transmit, from the first communication device, the trigger MPDU to the second communication device.

In an embodiment, a method includes receiving, at a wireless local area network (WLAN) interface of a first communication device and from a second communication device, a trigger medium access control protocol data unit (MPDU) configured to solicit the first communication device to transmit a trigger-based data unit to the second communication device. The trigger MPDU includes a transmit power indication that indicates that a transmit power level of the trigger-based data unit is to be selected by the first communication device. The method also includes determining the transmit power level of the trigger-based data unit using a parameter of a non-WLAN wireless interface of the first communication device. The method also includes generating, at the first communication device, the trigger-based data unit to be transmitted to the second communication device. The method also includes transmitting, from the first communication device, the trigger-based data unit to the second communication device using the WLAN interface at the determined transmit power level.

DETAILED DESCRIPTION

Orthogonal frequency division multiple access (OFDMA) or multi-user multiple input, multiple output (MU-MIMO) techniques allow for increased efficiency when two or more client stations simultaneously send messages to, or simultaneously receive messages from, a same wireless device, for example, an access point (AP) of a wireless local area network (WLAN). When one or more client stations transmit a packet to an AP in response to a trigger frame, the AP indicates respective transmit power levels for the client stations so that interference among neighboring wireless devices can be controlled or reduced, in an embodiment. In some scenarios, a client station avoids multi-user (MU) transmissions because using a transmit power indicated by the AP interferes with other transmitters of the client station. For example, a client station using both a WLAN interface and a Bluetooth interface, or a combined WLAN/Bluetooth interface, may experience undesirable interference when transmitting on the WLAN interface with the indicated transmit power while simultaneously receiving on the Bluetooth interface. In an embodiment, the client station indicates to the AP that it will not transmit using an indicated transmit power and the AP uses a trigger frame that indicates a client-selectable transmit power. In some scenarios, the client-selectable transmit power allows for more efficient use of multiple wireless interfaces by the client station.

Figure 1:
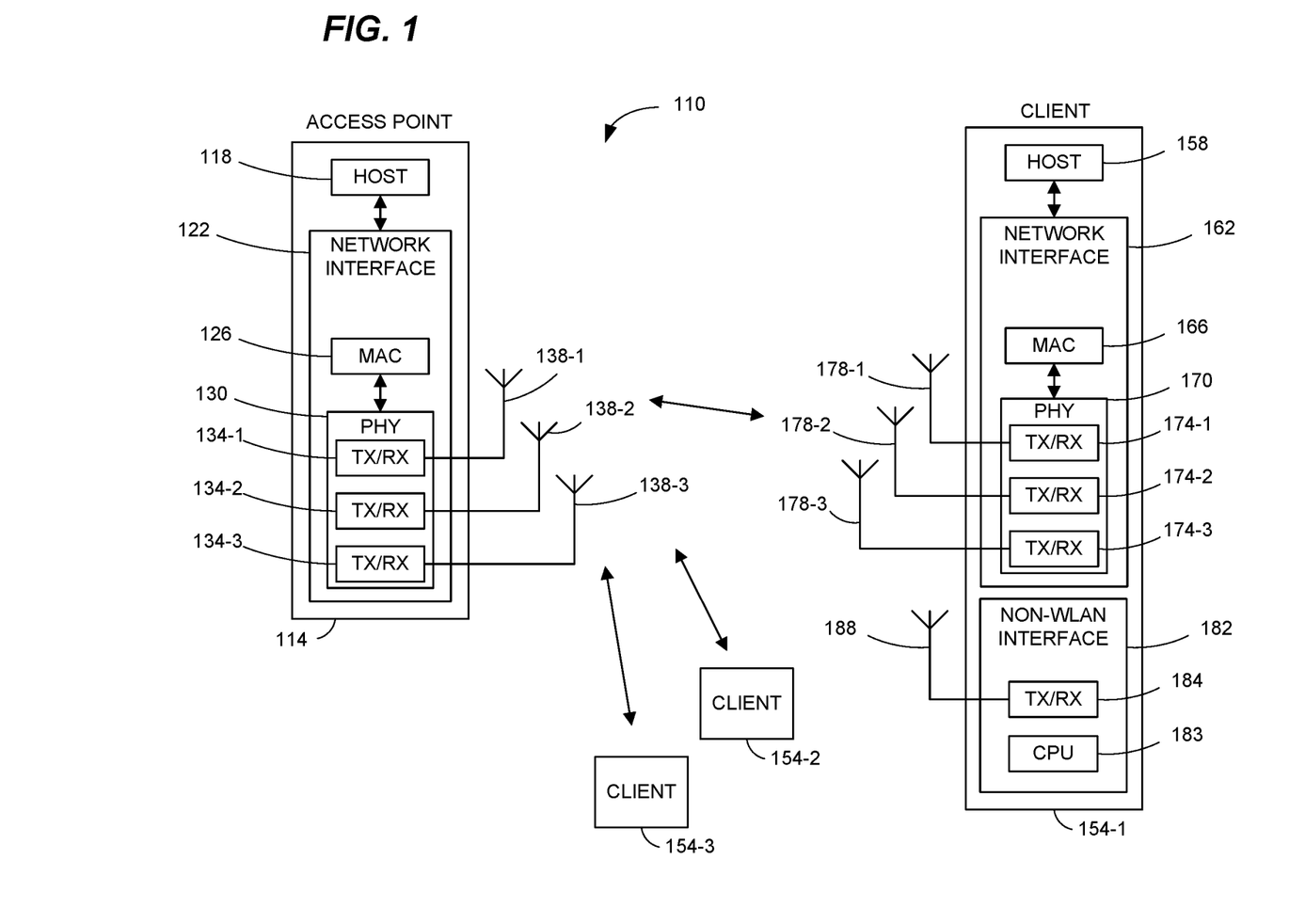
FIG. 1 is a block diagram of an example wireless local area network (WLAN), according to an embodiment.

FIG. 1 is a block diagram of an example WLAN 110, according to an embodiment. The WLAN 110 includes an access point (AP) 114 that comprises a host processor 118 coupled to a network interface device 122. The network interface 122 includes a medium access control (MAC) processor 126 and a physical layer (PHY) processor 130. The PHY processor 130 includes a plurality of transceivers 134, and the transceivers 134 are coupled to a plurality of antennas 138. Although three transceivers 134 and three antennas 138 are illustrated in FIG. 1, the AP 114 includes other suitable numbers (e.g., 1, 2, 4, 5, etc.) of transceivers 134 and antennas 138 in other embodiments. In some embodiments, the AP 114 includes a higher number of antennas 138 than transceivers 134, and antenna switching techniques are utilized.

The network interface 122 is implemented using one or more integrate circuits (ICs) configured to operate as discussed below. For example, the MAC processor 126 may be implemented, at least partially, on a first IC, and the PHY processor 130 may be implemented, at least partially, on a second IC. As another example, at least a portion of the MAC processor 126 and at least a portion of the PHY processor 130 may be implemented on a single IC. For instance, the network interface 122 may be implemented using a system on a chip (SoC), where the SoC includes at least a portion of the MAC processor 126 and at least a portion of the PHY processor 130.

In various embodiments, the MAC processor 126 and/or the PHY processor 130 of the AP 114 are configured to generate data units, and process received data units, that conform to a WLAN communication protocol such as a communication protocol conforming to the IEEE 802.11 Standard or another suitable wireless communication protocol. For example, the MAC processor 126 may be configured to implement MAC layer functions, including MAC layer functions of the WLAN communication protocol, and the PHY processor 130 may be configured to implement PHY functions, including PHY functions of the WLAN communication protocol. For instance, the MAC processor 126 may be configured to generate MAC layer data units such as MAC service data units (MSDUs), MAC protocol data units (MPDUs), etc., and provide the MAC layer data units to the PHY processor 130. The PHY processor 130 may be configured to receive MAC layer data units from the MAC processor 126 and encapsulate the MAC layer data units to generate PHY data units such as PHY protocol data units (PPDUs) for transmission via the antennas 138. Similarly, the PHY processor 130 may be configured to receive PHY data units that were received via the antennas 138, and extract MAC layer data units encapsulated within the PHY data units. The PHY processor 130 may provide the extracted MAC layer data units to the MAC processor 126, which processes the MAC layer data units.

The WLAN 110 includes a plurality of client stations 154. Although three client stations 154 are illustrated in FIG. 1, the WLAN 110 includes other suitable numbers (e.g., 1, 2, 4, 5, 6, etc.) of client stations 154 in various embodiments. The client station 154-1 includes a host processor 158 coupled to one or more network interface devices, such as network interface device 162 and network interface device 182. In various embodiments, the network interface device 162 and the network interface device 182 support different wireless communication protocols. In an embodiment, for example, the network interface device 162 supports a WLAN communication protocol (e.g., IEEE 802.11ac, IEEE 802.11ax, etc.) and the network interface device 182 supports a non-WLAN communication protocol, such as Bluetooth, Zigbee, wireless personal area network (WPAN) protocol, near field communication protocol, radio frequency identification protocol, or other suitable wireless protocol. In some embodiments, the network interface device 182 is omitted.

The network interface 162 includes a MAC processor 166 and a PHY processor 170. The PHY processor 170 includes a plurality of transceivers 174, and the transceivers 174 are coupled to a plurality of antennas 178. Although three transceivers 174 and three antennas 178 are illustrated in FIG. 1, the client station 154-1 includes other suitable numbers (e.g., 1, 2, 4, 5, etc.) of transceivers 174 and antennas 178 in other embodiments. In some embodiments, the client station 154-1 includes a higher number of antennas 178 than transceivers 174, and antenna switching techniques are utilized.

The network interface 162 is implemented using one or more ICs configured to operate as discussed below. For example, the MAC processor 166 may be implemented on at least a first IC, and the PHY processor 170 may be implemented on at least a second IC. As another example, at least a portion of the MAC processor 166 and at least a portion of the PHY processor 170 may be implemented on a single IC. For instance, the network interface 162 may be implemented using an SoC, where the SoC includes at least a portion of the MAC processor 166 and at least a portion of the PHY processor 170.

In various embodiments, the MAC processor 166 and the PHY processor 170 of the client device 154-1 are configured to generate data units, and process received data units, that conform to the WLAN communication protocol or another suitable communication protocol. For example, the MAC processor 166 may be configured to implement MAC layer functions, including MAC layer functions of the WLAN communication protocol, and the PHY processor 170 may be configured to implement PHY functions, including PHY functions of the WLAN communication protocol. The MAC processor 166 may be configured to generate MAC layer data units such as MSDUs, MPDUs, etc., and provide the MAC layer data units to the PHY processor 170. The PHY processor 170 may be configured to receive MAC layer data units from the MAC processor 166 and encapsulate the MAC layer data units to generate PHY data units such as PPDUs for transmission via the antennas 178. Similarly, the PHY processor 170 may be configured to receive PHY data units that were received via the antennas 178, and extract MAC layer data units encapsulated within the PHY data units. The PHY processor 170 may provide the extracted MAC layer data units to the MAC processor 166, which processes the MAC layer data units.

The network interface device 182 includes a suitable processor, such as central processing unit 183, configured to generate data units and process received data units that conform to the non-WLAN protocol. The network interface device 182 also includes one or more transceivers 184, and the transceivers 184 are coupled to one or more antennas 188. Although only one transceiver 184 and one antenna 188 are illustrated in FIG. 1, the client station 154-1 includes other suitable numbers (e.g., 2, 3, 4, 5, etc.) of transceivers 184 and antennas 188 in other embodiments. In some embodiments, the client station 154-1 includes a higher number of antennas 188 than transceivers 184, and antenna switching techniques are utilized.

In some embodiments, two or more network interface devices (e.g., network interface device 162 and network interface device 182) share one or more transceivers and/or antennas. In an embodiment, for example, the transceiver 184 is coupled to one or more of the antennas 178 in addition to being coupled to the antenna 188. In another embodiment, the CPU 183 is coupled with one or more of the transceivers 174, in other words, the network interface device 162 and network interface device 182 form a combined network interface device that supports multiple wireless protocols, such as a WLAN/Bluetooth interface device. In this embodiment, the combined network interface device is configured to share one or more resources (e.g., processor cycles, memory, radio resource units, time slots, etc.) to support the multiple wireless protocols.

In an embodiment, each of the client stations 154-2 and 154-3 has a structure that is the same as or similar to the client station 154-1. Each of the client stations 154-2 and 154-3 has the same or a different number of transceivers and antennas. For example, the client station 154-2 and/or the client station 154-3 each have only two transceivers and two antennas (not shown), according to an embodiment.

Figure 2A:
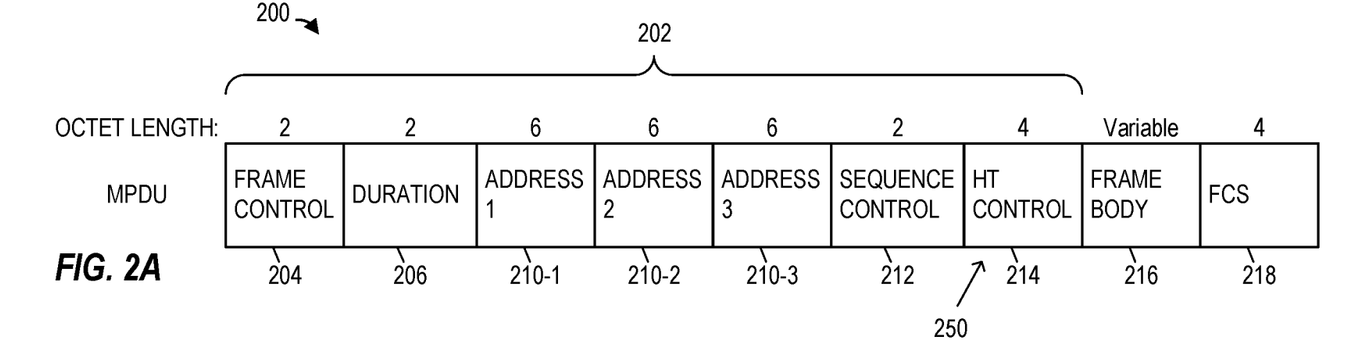
FIG. 2A is a block diagram of an example medium access control (MAC) protocol data unit (MPDU) that includes a multi-user status indicator, according to an embodiment.

FIG. 2A is a diagram of an MPDU 200 that includes a multi-user status indicator 250, according to an embodiment. In an embodiment, for example, the MAC processor 166 generates the MPDU 200 and provides the MPDU 200 to the PHY processor 170 for encapsulation in a PPDU (not shown) and transmission to another network device (e.g., the AP 114). In various embodiments, at least a portion of the MPDU 200 generally conforms to the IEEE Standard for Information Technology, Part 11: Wireless LAN Medium Access Control (MAC) and Physical Layer (PHY) Specifications, Amendment 4, Enhancements for Very High Throughput for Operation in Bands below 6 GHz, 2013 ("the IEEE 802.11ac-2013 standard"), the disclosure of which is incorporated herein by reference in its entirety. In the embodiment shown in FIG. 2A, the MPDU 200 is a management frame with at least a portion that conforms to the IEEE 802.11ac-2013 standard or the IEEE 802.11ax draft standard. In other embodiments, the MPDU 200 is a different frame, such as a QoS Data frame or other suitable frame that includes the multi-user status indicator 250.

The client station 154-1 sets the multi-user status indicator 250 to indicate to the AP 114 whether it will participate in uplink MU transmissions scheduled by the AP 114, in various scenarios. For example, the client station 154-1 sets the multi-user status indicator 250 to a first value (e.g., "1") to avoid uplink MU transmissions that interfere with a different network interface (e.g., non-WLAN network interface device 182), and to a second value (e.g., "0") to allow requests for uplink MU transmissions.

In the embodiment shown in FIG. 2A, the MPDU 200 is a management frame that includes a MAC header 202, a frame body 216, and a frame check sequence field 218. The number above each field in FIG. 2A indicates the number of octets ("Octet Length") occupied by the corresponding field. Accordingly, the MAC header 202 includes a frame control field 204 (2 octets), a duration/ID field 206 (2 octets), a first address (A1) field 210-1 (6 octets), a second address (A2) field 210-2 (6 octets), a third address (A3) field (6 octets) 210-3, a sequence control field 212 (2 octets), and an HT control field 214 (4 octets). The MPDU 200 also includes the frame body 216 and the four-octet frame check sequence (FCS) field 218. In some embodiments, the frame body 216 is omitted (e.g., a null data frame). Each of the address fields 210 is a 48 bit (6 octet) field that includes a globally unique MAC address of a device associated with the MPDU 200, such as a transmitting device of the MPDU 200, a receiving device of the MPDU 200, etc. In some embodiments, the MAC header 202 omits one or more fields illustrated in FIG. 2A. In some embodiments, the MAC header 202 includes additional fields not illustrated in FIG. 2A. In the embodiment shown in FIG. 2A, the MPDU 200 includes the multi-user status indicator 250 within the HT control field 214.

Figure 2B:
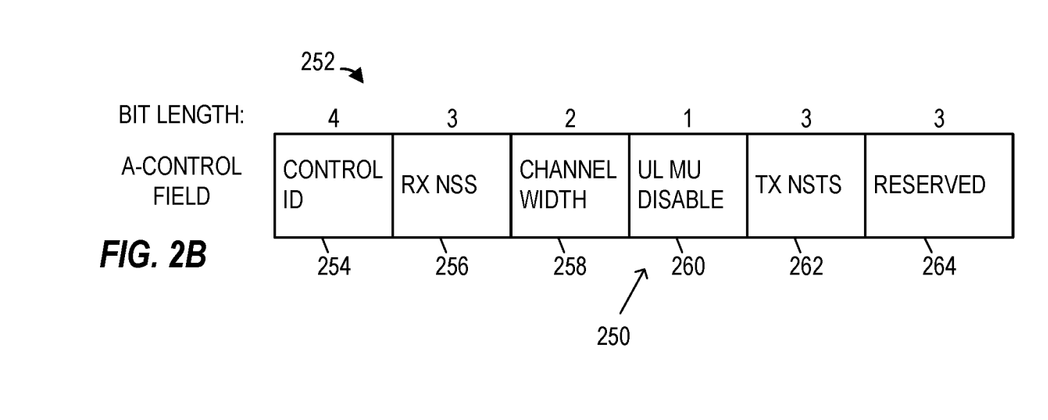
FIG. 2B is a block diagram of an example control field of the MPDU of FIG. 2A, according to an embodiment.

FIG. 2B is a block diagram of an example control field 252 of an MPDU, according to an embodiment. The control field 252 generally corresponds to the HT control field 214 of the MPDU 200 of FIG. 2A, according to an embodiment. The number above each field in FIG. 2B indicates the number of bits ("Bit Length") occupied by the corresponding field. In the embodiment shown in FIG. 2B, the control field 252 is an "A-Control field" according to the IEEE 802.11ax draft standard and includes a control ID field 254 (4 bits), an RX NSS field 256 (3 bits), a channel width field 258 (2 bits), an uplink multi-user (UL MU) disable field 260 (1 bit), a TX NSTS field 262 (3 bits), and a reserved field 264 (3 bits). The control ID subfield 254 indicates a format of the control field 252 as an Operation Mode Control subfield, in an embodiment. In an embodiment, the UL MU disable field 260 generally corresponds to the multi-user status indicator 250. In another embodiment, a different field (e.g., one or more bits of the reserved field 264 or other suitable field) correspond to the multi-user status indicator 250.

Figure 3A:
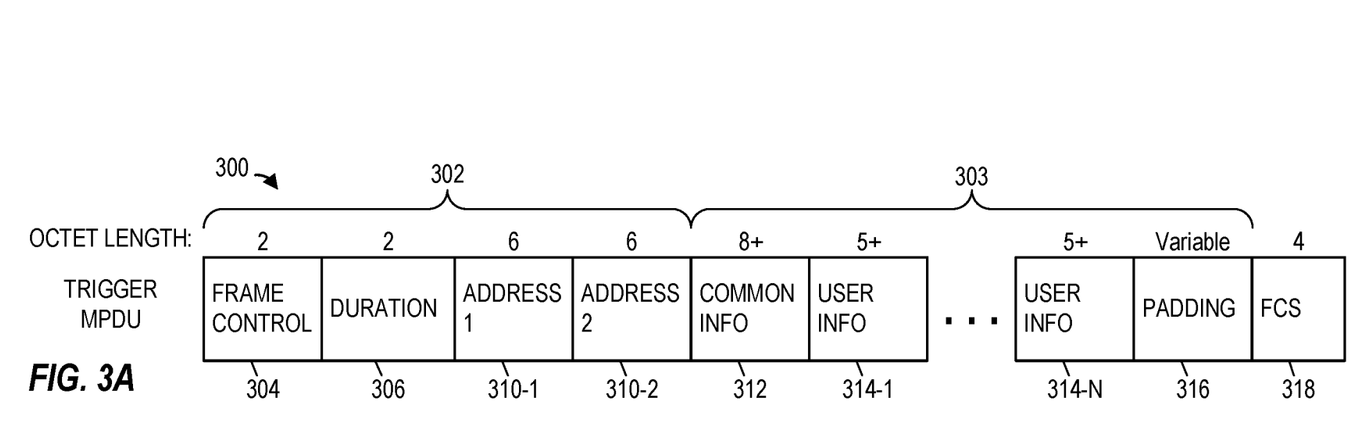
FIG. 3A is a block diagram of an example trigger MPDU that includes a transmit power level indication, according to an embodiment.

FIG. 3A is a block diagram of an example trigger MPDU 300 that includes one or more transmit power level indications, according to an embodiment. In an embodiment, for example, the MAC processor 126 of the AP 114 generates the trigger MPDU 300 and provides the trigger MPDU 300 to the PHY processor 130 for encapsulation in a PPDU (not shown) and transmission to one or more other network devices (e.g., client stations 154). In the embodiment shown in FIG. 3A, the trigger MPDU 300 includes a MAC header 302, a frame body 303, and a frame check sequence field 318. The number above each field in FIG. 3A indicates the number of octets ("Octet Length") occupied by the corresponding field. The MAC header 302 includes a frame control field 304 (2 octets), a duration/ID field 306 (2 octets), a first address (A1) field 310-1 (6 octets), and a second address (A2) field 310-2 (6 octets). The frame body 303 includes a common information field 312 (8 or more octets), one or more (N) user information fields (5 or more octets) 314-1 to 314-N corresponding to the one or more other network devices to which the trigger MPDU 300 is to be transmitted, and an optional padding field (variable length) 316.

In some scenarios, the AP 114 generates and transmits the trigger MPDU 300 to a plurality of client stations 154 to request that the client stations 154 simultaneously transmit respective trigger-based data units in an UL MU transmission. In some embodiments and/or scenarios, the AP 114 generates the trigger MPDU 300 to indicate a transmit power level of the trigger MPDU 300 (e.g., a transmit power level at which the trigger MPDU 300 is transmitted) and to indicate respective target received signal strength indicators (target RSSI) that the client stations 154 should attempt to meet when transmitting the respective trigger-based data units in response to the trigger MPDU 300. In an embodiment, for example, a client station 154 receives the trigger MPDU 300 at a corresponding RSSI, estimates channel conditions for the communication channel on which the trigger MPDU 300 was transmitted (e.g., using a difference between the transmit power level of the trigger MPDU 300 and the RSSI of the trigger MPDU 300 as received at the client station 154), and determines a suitable transmit power at which to transmit the trigger-based data unit in response to the trigger MPDU 300 using the estimated channel conditions.

Figure 3B:
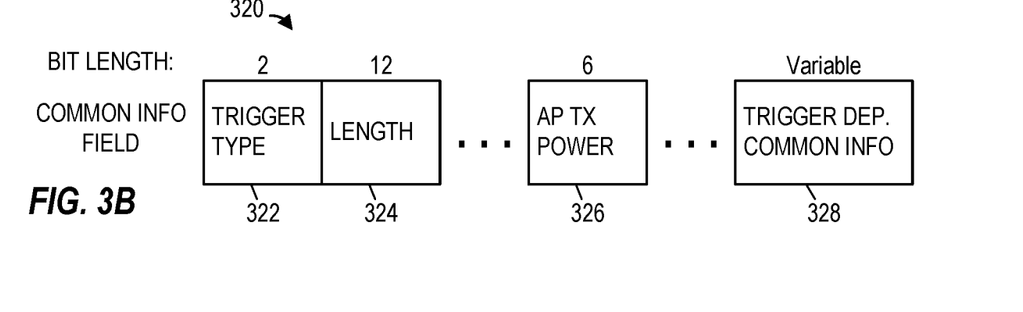
FIG. 3B is a block diagram of an example common information field of the trigger MPDU of FIG. 3A that includes the transmit power level indication, according to an embodiment.

FIG. 3B is a block diagram of an example common information field 320, according to an embodiment. The common information field 320 generally corresponds to the common information field 312 of the trigger MPDU 300 of FIG. 3A, in an embodiment. The number above each field in FIG. 3B indicates the number of bits ("Bit Length") occupied by the corresponding subfield. In the embodiment shown in FIG. 3B, at least some of the common information field 320 corresponds to the IEEE 802.11ax draft standard and includes a trigger type subfield (2 bits) 322, a length subfield (12 bits) 324, an access point transmit (AP TX) power subfield (6 bits) 326, a trigger dependent common information subfield 328, and one or more additional fields (not shown). The AP TX power subfield 326 indicates the transmit power level of the trigger MPDU 300, in some scenarios. In some scenarios, for example, the AP TX power subfield 326 indicates the combined average power per 20 MHz bandwidth reference to an antenna connector, of all transmit antennas used to transmit the corresponding trigger MPDU 300. For example, values of 0 to 60 of the 6 bits of the AP TX power subfield 326 map to −20 dBm to 40 dBm, while values of 61-63 are reserved values.

In some embodiments and/or scenarios, the AP 114 sets the AP TX power subfield 326 to a value that indicates an "undefined" value when received and/or decoded by the client station 154. In an embodiment, for example, the AP 114 sets the AP TX power subfield 326 to a value of 61, 62, or 63 (e.g., one of the reserved values) to indicate the undefined value. In an embodiment, the AP 114 uses the undefined value to indicate to the client station 154 that the client station 154 is to select the transmit power level of the trigger-based data unit independently of the transmit power level of the trigger MPDU 300. In an embodiment, for example, the AP 114 schedules only one client station 154 for an uplink transmission, instead of scheduling a MU uplink transmission. This allows the client station 154 to select any suitable transmit power for the trigger-based data unit.

Figure 3C:
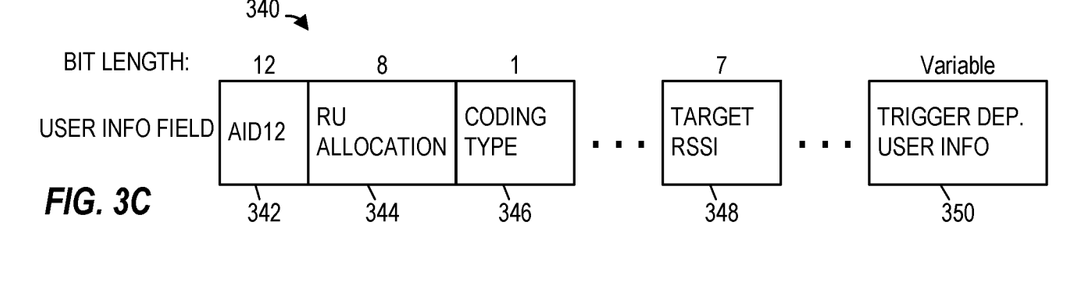
FIG. 3C is a block diagram of an example user information field of the trigger MPDU of FIG. 3A that includes the transmit power level indication, according to an embodiment.

FIG. 3C is a block diagram of an example user information field 340, according to an embodiment. The user information field 340 generally corresponds to the user information field 314 of the trigger MPDU 300 of FIG. 3A, according to an embodiment. The number above each field in FIG. 3C indicates the number of bits ("Bit Length") occupied by the corresponding subfield. In the embodiment shown in FIG. 3C, at least some of the user information field 340 corresponds to the IEEE 802.11ax draft standard and includes an association identification (AID12) subfield (12 bits) 342, a resource unit allocation subfield (8 bits) 344, a coding type subfield (1 bit) 346, a target RSSI subfield (7 bits) 348, a trigger dependent user information subfield (variable length) 350, and one or more additional fields (not shown). The target RSSI subfield 348 indicates the target received signal power averaged over the antenna connectors of the AP 114 for the trigger-based data unit. For example, values of 0 to 90 of the 7 bits of the target RSSI subfield 348 map to −110 dBm to −20 dBm, while values of 91-126 are reserved values, and a value of 127 indicates that the client station 154 should transmit the trigger-based data unit at its maximum transmit power level for a modulation and coding scheme (MCS) at which the trigger-based data unit will be transmitted.

In some embodiments and/or scenarios, the AP 114 sets the target RSSI subfield 348 to a value that indicates an "undefined" value when received by the client station 154. In an embodiment, for example, the AP 114 sets the target RSSI subfield 348 to a value of 91, 92, 126, etc. (e.g., one of the reserved values) to indicate the undefined value. In an embodiment, the AP 114 uses the undefined value to indicate to the client station 154 that the client station 154 is to select the transmit power level of the trigger-based data unit independently of the target RSSI level of the trigger MPDU 300. In an embodiment, the AP sets the target RSSI subfield to a value of "127" to indicate the undefined value, for example, redefining the meaning of the value of 127 as compared to a legacy protocol (e.g., IEEE 802.11ac, 802.11n, etc.).

Figure 4:
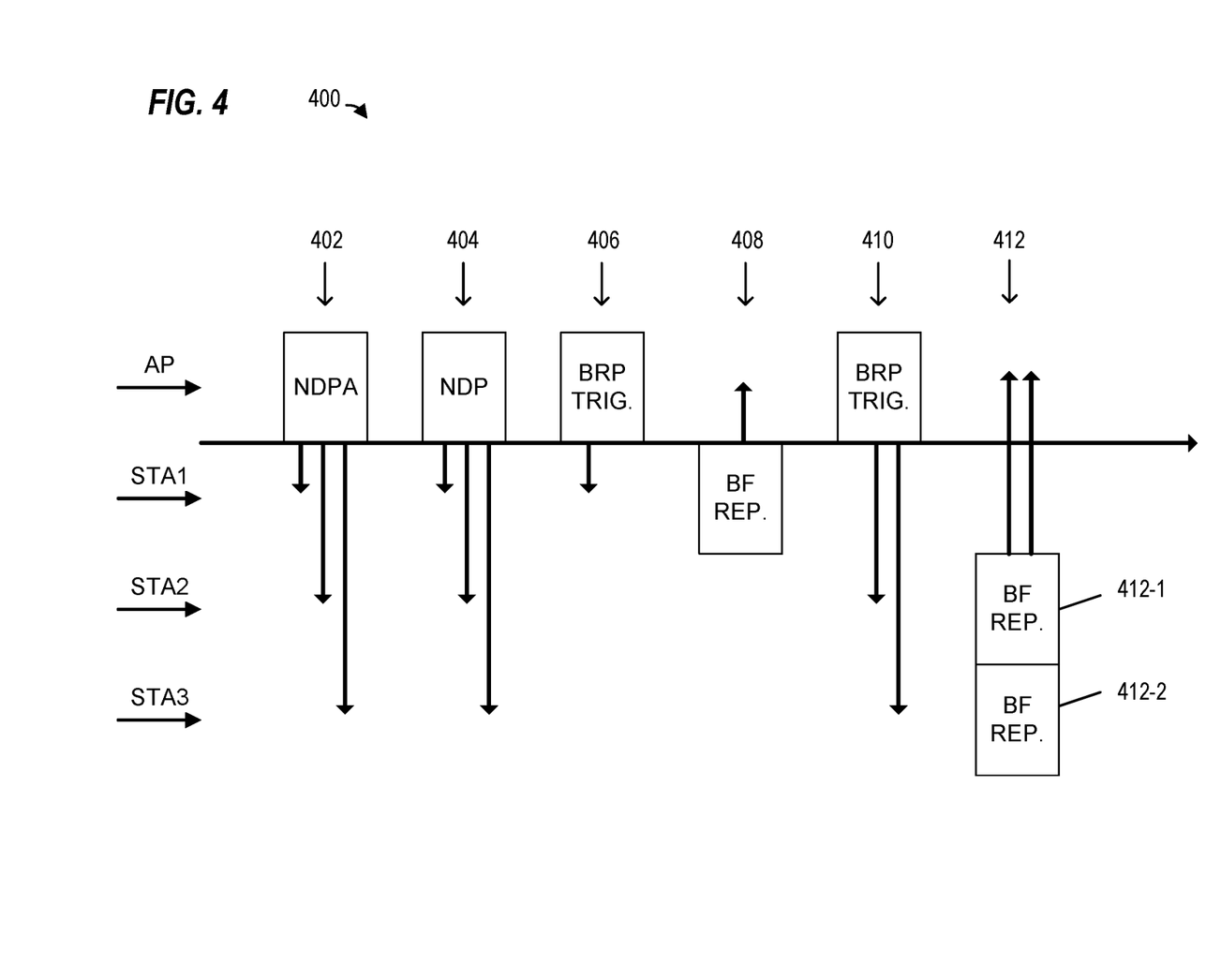
FIG. 4 is a message flow diagram of an example sounding procedure, according to an embodiment.

FIG. 4 is a message flow diagram of an example sounding procedure 400, according to an embodiment. In an embodiment, the AP 114 and client stations 154 perform the sounding procedure 400 to determine respective steering matrices that are applied to a transmit signal by the AP 114 to optimize reception of a downlink transmission at the client stations 154 (e.g., transmit beamforming or DL MU-MIMO). In an embodiment, for example, the client station (i.e., as a beamformee) measures one or more channel state characteristics using a training signal (i.e., an HE NDP PPDU) transmitted by the AP 114 and sends back a transformed estimate of the channel state. However, where a client station will not participate in uplink MU transmissions scheduled by the AP 114, the client station may not be able to provide the estimate of the channel state simultaneously with other client stations. In another embodiment, the AP 114 generates the trigger MPDU 300 to include only one instance of the user information field 314 and sets the target RSSI subfield to a reserved value or a particular value to indicate that the destination client station can use any suitable transmission power to transmit the PPDU 408.

The embodiment shown in FIG. 4 is provided as an example sounding procedure of the AP 114 with three client stations (STA1, STA2, STA3), where the client station STA1 has previously indicated to the AP 114 that it will not participate in uplink MU transmissions. In an embodiment, for example, the client station STA1 transmits the MPDU 200 with the control field 252 to the AP 114, as discussed above with respect to FIG. 2A and FIG. 2B, to indicate that it will not participate in uplink MU transmissions. In the embodiment shown in FIG. 4, the AP 114 obtains the estimate of the channel state for the client station STA1 separately from the channel states provided by the client station STA2 and the client station STA3. In other embodiments, the AP 114 performs a sounding procedure with 1, 2, 4, or more client stations with two or more client stations that will not participate in uplink MU transmissions.

During the sounding procedure 400, the AP 114 transmits a null data packet announcement (NDPA) 402 to the client stations STA1, STA2, and STA3 (e.g., to a broadcast address associated with the AP 114). The NDPA indicates to the client stations that a training signal will be transmitted and requests that the client stations measure channel state conditions using the training signal. After transmission of the NDPA 402 (e.g., after a short interframe space), the AP 114 transmits a null data packet (NDP) 404 as the training signal to the client stations STA1, STA2, and STA3. In other embodiments, a different suitable training signal is used.

The AP 114 provides a trigger MPDU to the client stations to schedule an uplink transmission with the estimate of the channel state from each of the client stations, for example, a beamforming (BF) report, in an embodiment. In the embodiment shown in FIG. 4, the AP 114 provides a trigger MPDU 406 for the client station STA1 that is separate from a trigger MPDU 410 for the client stations STA2 and STA3 so that the client station STA1 provides a BF report 408 separately from BF reports 412 from the client stations STA2 and STA3. In an embodiment, the AP 114 generates the trigger MPDU 406 as an instance of the trigger MPDU 300. In an embodiment, the AP 114 indicates that the client station STA1 may use any transmit power to transmits its sounding feedback in an HE TB PPDU (e.g., the PPDU 408). For example, the AP 114 generates the trigger MPDU 406 with a trigger type subfield 322 set to a value of "1" to indicate a beamforming report poll.

Figure 5:
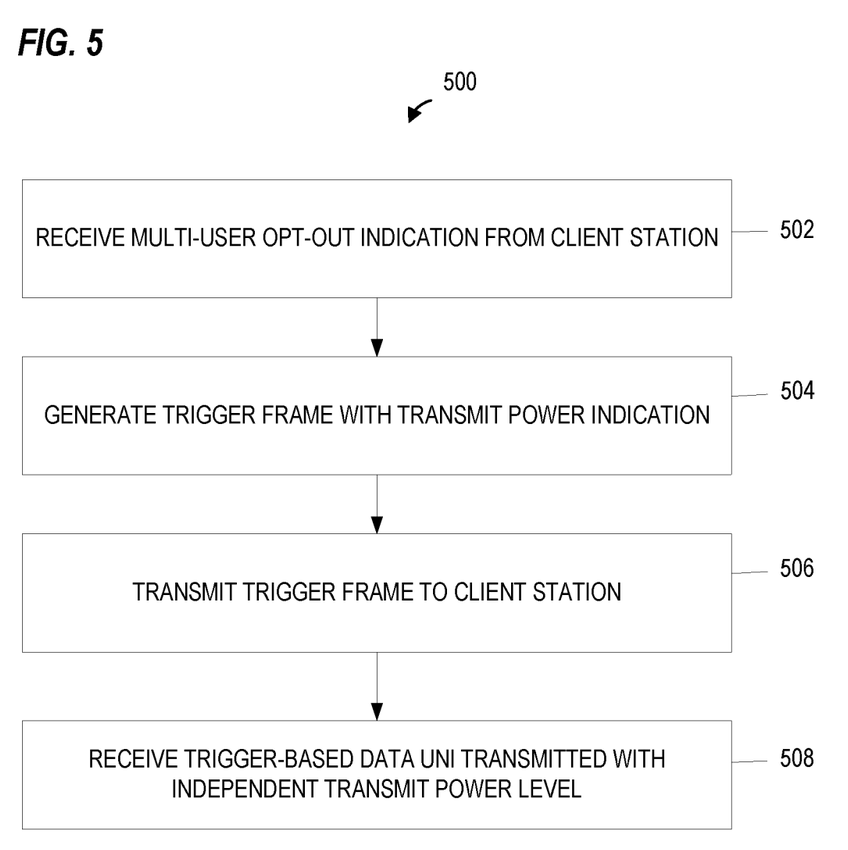
FIG. 5 is a flow diagram of an example method of transmitting a trigger MPDU to a client station, according to an embodiment.

FIG. 5 is a flow diagram of an example method 500 of transmitting a trigger MPDU to a client station, according to an embodiment. In some embodiments, the network interface device 122 (generally, the AP 114) of FIG. 1 is configured to implement method 500. The method 500 is described, however, in the context of the AP 114 merely for explanatory purposes and, in other embodiments, the method 500 is implemented by another suitable device.

At block 502, the AP 114 receives a multi-user opt-out indication from a client station. In an embodiment, the multi-user opt-out indication is the MPDU 200 that includes the multi-user status indicator 250. For example, the client station STA1 generates the MPDU 200 with the UL MU Disable subfield 260 set to a value of "1" to indicate that it will not participate in uplink MU transmissions scheduled by the AP 114 and transmits the MPDU 200 for receipt by the AP 114.

At block 504, the AP 114 generates a trigger MPDU configured to solicit a second communication device to transmit a trigger-based data unit to the AP 114. Generating the trigger includes setting a transmit power indication in the trigger MPDU that indicates that a transmit power level of the trigger-based data unit is to be selected by the second communication device, in an embodiment. In some embodiments, the transmit power indication indicates that a transmit power level of the trigger MPDU is an undefined value. In some embodiments, the transmit power indication indicates that the transmit power level of the trigger-based data unit is independent of a target received signal strength indicator (RSSI) for the first communication device. For example, the AP 114 generates the trigger MPDU 300 as the MPDU 406 and sets the AP TX power subfield 326 to the "undefined" value, sets the target RSSI subfield 348 to the "undefined" value, or sets both the AP TX power subfield 326 and target RSSI subfield 348 to their respective "undefined" values.

In an embodiment, the transmit power indication is a target RSSI subfield of the trigger MPDU that has a value that indicates to the second communication device to transmit the trigger-based data unit at any transmit power level of the second communication device. In some embodiments, the trigger MPDU solicits the second communication device to transmit the trigger-based data unit via a wireless local area network (WLAN) interface and the transmit power indication indicates to the second communication device to select the transmit power level using a non-WLAN wireless interface parameter (for example, a Bluetooth wireless interface parameter or transmission status). In an embodiment, the transmit power indication indicates that the transmit power level of the trigger-based data unit is to be selected by the second communication device without using a transmit power level of the trigger MPDU.

At block 506, the AP 114 transmits the trigger MPDU to the second communication device. For example, the AP 114 transmits the trigger MPDU 406 to the client station STA1.

At block 508, the AP 114 receives a trigger-based data unit from the second communication device, where the trigger-based data unit has been transmitted by the second communication device at a power level that is independent of the transmit power level of the trigger MPDU. For example, the client station STA1 receives the trigger MPDU 406 from the AP 114, determines a transmit power level that is independent of the transmit power of the trigger MPDU 406, and transmits the trigger-based data unit 408 to the AP 114.

Figure 6:
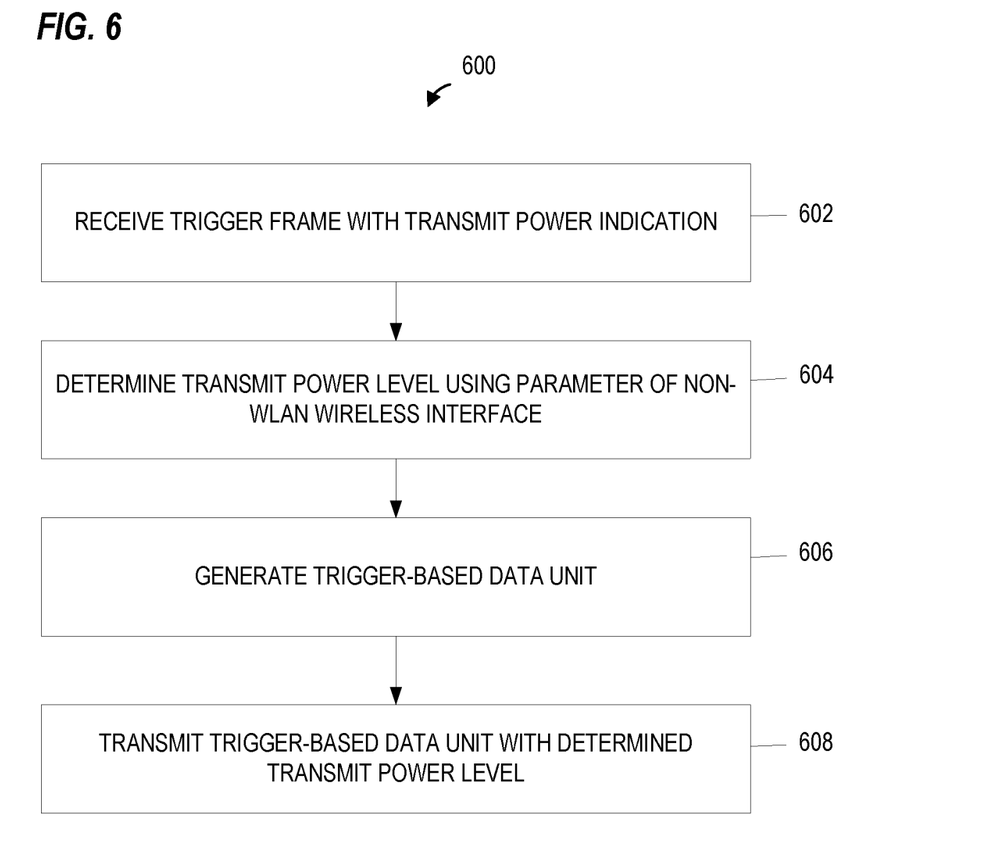
FIG. 6 is a flow diagram of an example method of transmitting a trigger-based data unit in response to a trigger MPDU, according to an embodiment.

FIG. 6 is a flow diagram of an example method 600 of transmitting a trigger-based data unit in response to a trigger MPDU, according to an embodiment. In some embodiments, the network interface device 162 (generally, the client station 154) of FIG. 1 is configured to implement method 600. The method 600 is described, however, in the context of the client station 154 merely for explanatory purposes and, in other embodiments, the method 600 is implemented by another suitable device.

At block 602, the client station 154 receives, at a wireless local area network (WLAN) interface and from a second communication device, a trigger MPDU configured to solicit the client station 154 to transmit a trigger-based data unit to the second communication device. In an embodiment, for example, the client station 154 receives the trigger MPDU 300 via the network interface device 162. The trigger MPDU includes a transmit power indication that indicates that a transmit power level of the trigger-based data unit is to be selected by the client station 154. In various embodiments, for example, the trigger MPDU 300 has the AP TX power subfield 326 set to the "undefined" value, the target RSSI subfield 348 set to the "undefined" value, or both the AP TX power subfield 326 and target RSSI subfield 348 set to their respective "undefined" values.

At block 604, the client station 154 determines a transmit power level of the trigger-based data unit using a parameter of a non-WLAN wireless interface of the client station 154. For example, the client station 154 uses a parameter of the non-WLAN interface 182 to determine the transmit power level to be used by the WLAN interface 162. In an embodiment, the client station 154 uses a transmission status of the non-WLAN interface 182 to determine the transmit power level. For example, the client station 154 selects a lower transmit power level when the non-WLAN interface 182 is currently transmitting than when the non-WLAN interface 182 is not transmitting. In some embodiments, the client station 154 uses other parameters related to the non-WLAN interface 182 to determine the transmit power level to be used by the WLAN interface 162, for example, a current transmission power, modulation and coding scheme, interference level, received signal strength, frequency, bandwidth, or other suitable parameter of the non-WLAN interface 182. In an embodiment, the client station 154 determines the transmit power level of the trigger-based data unit independently of the transmit power of the trigger MPDU.

At block 606, the client station 154 generates the trigger-based data unit to be transmitted to the second communication device.

At block 608, the client station 154 transmits the trigger-based data unit to the second communication device using the WLAN interface at the determined transmit power level.

At least some of the various blocks, operations, and techniques described above may be implemented utilizing hardware, a processor executing firmware instructions, a processor executing software instructions, or any combination thereof. When implemented utilizing a processor executing software or firmware instructions, the software or firmware instructions may be stored in any computer readable memory such as on a magnetic disk, an optical disk, or other storage medium, in a RAM or ROM or flash memory, processor, hard disk drive, optical disk drive, tape drive, etc. The software or firmware instructions may include machine readable instructions that, when executed by one or more processors, cause the one or more processors to perform various acts.

When implemented in hardware, the hardware may comprise one or more of discrete components, an integrated circuit, an application-specific integrated circuit (ASIC), a programmable logic device (PLD), etc.

While the present invention has been described with reference to specific examples, which are intended to be illustrative only and not to be limiting of the invention, changes, additions and/or deletions may be made to the disclosed embodiments without departing from the scope of the invention.

What is claimed is:

1. A method comprising:
generating, at a first communication device, a trigger medium access control protocol data unit (MPDU) configured to solicit a second communication device to transmit a trigger-based data unit to the first communication device, including setting a transmit power indication in the trigger MPDU that indicates that the second communication device is permitted to select a transmit power level of the trigger-based data unit that does not meet a power requirement of the first communication device for the trigger-based data unit; and
transmitting, from the first communication device, the trigger MPDU to the second communication device.

2. The method of claim 1, wherein the transmit power indication indicates that a transmit power level of the trigger MPDU is an undefined value.

3. The method of claim 2, wherein the transmit power indication is an access point transmit (AP TX) power subfield of the trigger MPDU that has a value corresponding to the undefined value.

4. The method of claim 1, wherein the transmit power indication indicates that the transmit power level of the trigger-based data unit is independent of a target received signal strength indicator (RSSI) for the first communication device.

5. The method of claim 4, wherein the transmit power indication is a target RSSI subfield of the trigger MPDU that has a value that indicates to the second communication device to transmit the trigger-based data unit at any transmit power level of the second communication device.

6. The method of claim 1, wherein:
the trigger MPDU solicits the second communication device to transmit the trigger-based data unit via a wireless local area network (WLAN) interface; and
the transmit power indication indicates to the second communication device to select the transmit power level using a non-WLAN wireless interface parameter.

7. The method of claim 6, wherein the non-WLAN parameter is a Bluetooth interface parameter.

8. The method of claim 6, wherein the non-WLAN parameter is a Bluetooth interface transmission status.

9. The method of claim 1, wherein the transmit power indication indicates that the transmit power level of the trigger-based data unit is to be selected by the second communication device without using a transmit power level of the trigger MPDU.

10. An apparatus, comprising:
a network interface device associated with a first communication device, wherein the network interface device includes one or more integrated circuits (ICs) configured to:
generate a trigger medium access control protocol data unit (MPDU) configured to solicit a second communication device to transmit a trigger-based data unit to the first communication device, including setting a transmit power indication in the trigger MPDU that indicates that the second communication device is permitted to select a transmit power level of the trigger-based data unit that does not meet a power requirement of the first communication device for the trigger-based data unit, and
transmit, from the first communication device, the trigger MPDU to the second communication device.

11. The apparatus of claim 10, wherein the transmit power indication indicates that a transmit power level of the trigger MPDU is an undefined value.

12. The apparatus of claim 11, wherein the transmit power indication is an access point transmit (AP TX) power subfield of the trigger MPDU that has a value corresponding to the undefined value.

13. The apparatus of claim 10, wherein the transmit power indication indicates that the transmit power level of the trigger-based data unit is independent of a target received signal strength indicator (RSSI) for the first communication device.

14. The apparatus of claim 13, wherein the transmit power indication is a target RSSI subfield of the trigger MPDU that has a value that indicates to the second communication device to transmit the trigger-based data unit at any transmit power level of the second communication device.

15. The apparatus of claim 10, wherein:
the trigger MPDU solicits the second communication device to transmit the trigger-based data unit via a wireless local area network (WLAN) interface; and
the transmit power indication indicates to the second communication device to select the transmit power level using a non-WLAN wireless interface parameter.

16. The apparatus of claim 15, wherein the non-WLAN parameter is a Bluetooth interface parameter.

17. The apparatus of claim 15, wherein the non-WLAN parameter is a Bluetooth interface transmission status.

18. The apparatus of claim 10, wherein the transmit power indication indicates that the transmit power level of the trigger-based data unit is to be selected by the second communication device without using a transmit power level of the trigger MPDU.

19. A method comprising:
receiving, at a wireless local area network (WLAN) interface of a first communication device and from a second communication device, a trigger medium access control protocol data unit (MPDU) configured to solicit the first communication device to transmit a trigger-based data unit to the second communication device, wherein the trigger MPDU includes a transmit power indication that indicates that the first communication device is permitted to select a transmit power level of the trigger-based data unit that does not meet a power requirement of the second communication device for the trigger-based data unit;

in response to the transmit power indication that indicates that the first communication device is permitted to select a transmit power level of the trigger-based data unit that does not meet a power requirement of the second communication device for the trigger-based data unit, determining the transmit power level of the trigger-based data unit using a parameter of a non-WLAN wireless interface of the first communication device;

generating, at the first communication device, the trigger-based data unit to be transmitted to the second communication device; and transmitting, from the first communication device, the trigger-based data unit to the second communication device using the WLAN interface at the determined transmit power level.

20. The method of claim 19, wherein the transmit power indication is included in one or more of an access point transmit power subfield of the trigger MPDU and a target received signal strength indicator subfield of the trigger MPDU.

21. The first communication device of claim 19, wherein the one or more ICs are further configured to:
determine the transmit power level of the trigger-based data unit using the parameter of the non-WLAN wireless network interface device in response to the transmit power indication within one or more of an access point transmit power subfield of the trigger MPDU and a target received signal strength indicator subfield of the trigger MPDU.

22. A first communication device, comprising:
a wireless local area network (WLAN) interface device; and
a non-WLAN wireless network interface;
wherein the WLAN interface device comprises one or more integrated circuits (ICs) configured to:
receive, from a second communication device, a trigger medium access control protocol data unit (MPDU) configured to solicit the first communication device to transmit a trigger-based data unit to the second communication device, wherein the trigger MPDU includes a transmit power indication that indicates that the first communication device is permitted to select a transmit power level of the trigger-based data unit that does not meet a power requirement of the second communication device for the trigger-based data unit, in response to the transmit power indication that indicates that the first communication device is permitted to select a transmit power level of the trigger-based data unit that does not meet a power requirement of the second communication device for the trigger-based data unit, determine the transmit power level of the trigger-based data unit using a parameter of the non-WLAN wireless network interface device, generate the trigger-based data unit to be transmitted to the second communication device, and transmit the trigger-based data unit to the second communication device at the determined transmit power level.

\* \* \* \* \*